(12) United States Patent
Zagar et al.

(10) Patent No.: US 9,746,235 B2
(45) Date of Patent: Aug. 29, 2017

(54) INFRARED FLOAT BAR

(71) Applicant: MegTec Systems, Inc., DePere, WI (US)

(72) Inventors: Steven J. Zagar, Luxemburg, WI (US); Les Peterson, DePere, WI (US)

(73) Assignee: MegTec Systems, Inc., DePere, WI (US)

(*) Notice: Subject to any disclaimer, the term of this patent is extended or adjusted under 35 U.S.C. 154(b) by 726 days.

(21) Appl. No.: 13/890,582

(22) Filed: May 9, 2013

(65) Prior Publication Data
US 2013/0269204 A1 Oct. 17, 2013

Related U.S. Application Data

(62) Division of application No. 12/792,294, filed on Jun. 2, 2010, now Pat. No. 9,228,779.

(60) Provisional application No. 61/184,353, filed on Jun. 5, 2009.

(51) Int. Cl.
*F26B 3/34* (2006.01)
*F26B 3/30* (2006.01)
(Continued)

(52) U.S. Cl.
CPC ............ *F26B 3/30* (2013.01); *B41F 23/0413* (2013.01); *F26B 3/283* (2013.01); *F26B 13/104* (2013.01)

(58) Field of Classification Search
CPC ...... B41F 23/0413; F26B 3/30; F26B 13/104; F26B 3/283
(Continued)

(56) References Cited

U.S. PATENT DOCUMENTS 3,040,807 A   6/1962   Chope
3,384,282 A   5/1968   Vits
(Continued)

FOREIGN PATENT DOCUMENTS

CA   1313395 C    2/1993
CH   626 711 A5   11/1981
(Continued)

OTHER PUBLICATIONS

Japanese communication, with English translation, mailed Jan. 28, 2014 in corresponding Japanese patent application No. JP 2012-514084.
(Continued)

*Primary Examiner* — Kenneth Rinehart
*Assistant Examiner* — Bao D Nguyen
(74) *Attorney, Agent, or Firm* — Nields, Lemack & Frame, LLC

(57) ABSTRACT

Infrared air float bar for use in floating and drying a continuous planar web of a material in a dryer. Direct radiated or reflected infrared electromagnetic energy from an infrared light source in a removable channel assembly accelerates drying, or evaporation of solvents, or curing of web material passing in proximity to the bar, either by infrared electromagnetic energy, or in combination with convention airflow. The infrared source is cooled by pressurized air passing through an interior portion of the removable air bar channel assembly, and the air is further conducted into fluid contact with the web in an air gap between the emitter and web to promote convective heat transfer and to contribute to the air pressure field supporting web flotation. The removable channel assembly is configured for replacement of the infrared emitter and to allow the setting of the pressurized cooling air flow to the optimum level.

13 Claims, 13 Drawing Sheets

(51) Int. Cl.
*B41F 23/04* (2006.01)
*F26B 3/28* (2006.01)
*F26B 13/20* (2006.01)

(58) Field of Classification Search
USPC .......................................................... 34/274
See application file for complete search history.

(56) References Cited

U.S. PATENT DOCUMENTS

| | | | |
|---|---|---|---|
| 3,460,265 A | 8/1969 | Smith, Jr. | |
| 3,499,232 A | 3/1970 | Zimmermann | |
| 3,549,070 A | 12/1970 | Frost et al. | |
| 3,587,177 A | 6/1971 | Overly et al. | |
| 3,590,495 A | 7/1971 | Tyson et al. | |
| 3,640,219 A | 2/1972 | Farnham et al. | |
| 3,643,342 A | 2/1972 | Tyson et al. | |
| 3,675,336 A | 7/1972 | Dedrick | |
| 3,705,676 A | 12/1972 | Overly et al. | |
| 3,720,002 A | 3/1973 | Martin | |
| 3,733,461 A | 5/1973 | Rohats | |
| 3,763,571 A | 10/1973 | Vits | |
| 3,791,049 A | 2/1974 | Smith, Jr. | |
| 3,807,056 A | 4/1974 | Norfolk | |
| 3,815,254 A | 6/1974 | Mills | |
| 3,850,224 A | 11/1974 | Vidmar et al. | |
| 3,873,013 A | 3/1975 | Stibbe | |
| 3,950,650 A | 4/1976 | Pray et al. | |
| 4,015,340 A | 4/1977 | Treleven | |
| 4,021,931 A | 5/1977 | Russ et al. | |
| 4,074,841 A | 2/1978 | Kramer et al. | |
| 4,146,974 A | 4/1979 | Pray | |
| 4,188,731 A | 2/1980 | Rauskolb | |
| 4,197,971 A | 4/1980 | Stibbe | |
| 4,197,973 A | 4/1980 | Daane | |
| 4,201,323 A | 5/1980 | Stibbe et al. | |
| 4,265,384 A | 5/1981 | Daane | |
| 4,290,210 A | 9/1981 | Johansson | |
| 4,297,583 A | 10/1981 | Nerod | |
| 4,308,984 A | 1/1982 | Vits | |
| 4,336,279 A | 6/1982 | Metzger | |
| 4,359,826 A | 11/1982 | Rounsley | |
| 4,425,719 A | 1/1984 | Klein et al. | |
| 4,434,562 A | 3/1984 | Bubley et al. | |
| 4,494,316 A | 1/1985 | Stephansen et al. | |
| 4,501,072 A | 2/1985 | Jacobi, Jr. et al. | |
| 4,506,454 A | 3/1985 | Kerschgens | |
| 4,513,516 A | 4/1985 | Bjornberg | |
| 4,514,913 A | 5/1985 | Stephansen | |
| 4,575,952 A | 3/1986 | Bodenan et al. | |
| 4,590,685 A | 5/1986 | Roth | |
| 4,594,795 A | 6/1986 | Stephansen | |
| 4,606,137 A | 8/1986 | Whipple | |
| 4,615,122 A | 10/1986 | Sherrod et al. | |
| 4,638,571 A | 1/1987 | Cook | |
| 4,674,197 A | 6/1987 | Fleissner | |
| 4,693,013 A | 9/1987 | Pabst et al. | |
| 4,698,767 A | 10/1987 | Wensel et al. | |
| 4,727,655 A | 3/1988 | Jacobi, Jr. | |
| 4,756,091 A | 7/1988 | Van Denend | |
| 4,773,167 A | 9/1988 | Jacobi, Jr. | |
| 4,776,107 A | 10/1988 | Buske | |
| 4,785,986 A | 11/1988 | Daane et al. | |
| 4,809,608 A | 3/1989 | Wolnick et al. | |
| 4,854,052 A | 8/1989 | Korpela | |
| 4,901,449 A | 2/1990 | Wimberger | |
| 4,918,828 A | 4/1990 | Ruottu et al. | |
| 4,932,140 A | 6/1990 | Lepisto | |
| 4,936,025 A | 6/1990 | Heikkila | |
| 4,942,674 A | 7/1990 | Karlsson | |
| 4,949,478 A | 8/1990 | Socha | |
| 4,952,145 A | 8/1990 | Kwiatkowski et al. | |
| 5,009,016 A | 4/1991 | LePisto et al. | |
| 5,010,659 A | 4/1991 | Treleven | |
| 5,035,066 A | 7/1991 | Wimberger | |
| 5,060,572 A | 10/1991 | Waizmann | |
| 5,070,626 A * | 12/1991 | Jurgen | D21F 5/002 34/629 |
| D323,571 S | 1/1992 | Rogne | |
| 5,092,059 A * | 3/1992 | Wimberger | F26B 13/104 34/641 |
| 5,099,586 A | 3/1992 | Anderson | |
| 5,125,170 A | 6/1992 | Krimsky et al. | |
| 5,249,373 A | 10/1993 | Rogne et al. | |
| 5,261,166 A | 11/1993 | Seeley et al. | |
| 5,272,819 A | 12/1993 | Wimberger et al. | |
| 5,377,428 A | 1/1995 | Clark | |
| 5,395,029 A * | 3/1995 | Kurie | B65H 20/14 226/7 |
| 5,440,821 A | 8/1995 | Hamrin | |
| 5,443,539 A * | 8/1995 | Westelaken | F26B 17/1416 34/168 |
| 5,537,925 A | 7/1996 | Secor et al. | |
| 5,568,693 A | 10/1996 | Van Den Bergen et al. | |
| 5,638,611 A | 6/1997 | Oechsle | |
| 5,647,144 A | 7/1997 | Bria et al. | |
| 5,694,702 A | 12/1997 | Anderson | |
| 5,737,851 A | 4/1998 | Novak et al. | |
| 5,749,164 A | 5/1998 | Bowden | |
| 5,765,294 A | 6/1998 | Puschnerat | |
| 5,797,327 A | 8/1998 | Gieser et al. | |
| 5,813,134 A | 9/1998 | Min et al. | |
| 5,829,166 A | 11/1998 | Klas | |
| 5,867,920 A | 2/1999 | Rogne et al. | |
| 5,981,022 A | 11/1999 | Min et al. | |
| 6,049,995 A | 4/2000 | Rogne et al. | |
| 6,067,726 A | 5/2000 | Rogne et al. | |
| 6,095,047 A | 8/2000 | Dawley | |
| 6,195,909 B1 | 3/2001 | Rogne et al. | |
| 6,262,431 B1 | 7/2001 | Scherzer et al. | |
| 6,325,896 B1 | 12/2001 | Hultcrantz et al. | |
| 6,598,315 B1 | 7/2003 | Heikkilaet et al. | |
| 7,530,179 B2 | 5/2009 | Rocheleau | |
| 9,228,779 B2 | 1/2016 | Zagar et al. | |
| 2001/0053646 A1 | 12/2001 | Tanaka et al. | |
| 2003/0110659 A1 | 6/2003 | Mohr et al. | |
| 2003/0177927 A1 | 9/2003 | Dziedzic et al. | |
| 2005/0223593 A1 | 10/2005 | Rocheleau | |
| 2005/0243153 A1 | 11/2005 | Takahashi | |
| 2011/0131829 A1 | 6/2011 | Zagar et al. | |
| 2013/0104414 A1 | 5/2013 | Zagar | |
| 2014/0250713 A1 | 9/2014 | Zagar et al. | |

FOREIGN PATENT DOCUMENTS

| | | |
|---|---|---|
| DE | 23 51 280 A1 | 5/1975 |
| EP | 1777069 A2 | 4/2007 |
| GB | 636767 A | 5/1950 |
| GB | 1 443 679 A | 7/1976 |
| GB | 1 480 076 A | 7/1977 |
| JP | 61-256175 A | 11/1986 |
| JP | 62-102899 A | 5/1987 |
| JP | 63-502909 A | 10/1988 |
| JP | 2-26742 A | 1/1990 |
| JP | 10-509792 A | 9/1998 |
| JP | 2006-223980 A | 8/2006 |
| JP | 2007-120777 A | 5/2007 |
| JP | 2007-240066 A | 9/2007 |
| SE | 352 121 B | 12/1972 |
| SE | 7812565-5 A | 6/1980 |
| SE | 8303172 L | 12/1983 |
| SU | 566099 A2 | 7/1977 |
| WO | 87/04739 A1 | 8/1987 |
| WO | 96/18074 A1 | 6/1996 |
| WO | 02/16139 A1 | 2/2002 |

OTHER PUBLICATIONS

Japanese communication, with English translation, mailed Apr. 1, 2014 in corresponding Japanese patent application No. JP 2013-108824.

Canadian communication dated Mar. 17, 2015 in corresponding Canadian patent application No. 2,759,107.

(56) References Cited

OTHER PUBLICATIONS

European communication dated Mar. 11, 2015 in corresponding European patent application No. 14186655.8.
Japanese communication, with English translation, mailed Mar. 31, 2015 in corresponding Japanese patent application No. 2013-108824.
Glenro, Inc.; 1990; "Infrared Heaters Increase Line Speeds", 2-Pages.
Glenro, Inc.; 1990; Glenro News; "New Drying Technique Speeds Drying of Coatings on Webs" 1-Page.
Glenro, Inc.; 1990; Product Information, Increase Line Speeds, Reduce Energy Costs and Improve Product Qualty for Web Drying Applications, "Web Drying Ovens: High Velocity Hot Air Impingement Ovens With Electric Infrared Between the Nozzles" ; 3-Pages.
International Search Report and Written Opinion mailed Jul. 27, 2010 in corresponding PCT application No. PCT/US2010/037071.
International Preliminary Report on Patentability mailed Feb. 22, 2012 in corresponding PCT application No. PCT/US10/37071.
Australian Communication dated Mar. 21, 2012 in corresponding Australian Patent Application No. 2010256680, 3 pages.
Extended European Search Report dated Oct. 15, 2012 in corresponding European patent application No. EP 10784014.2.
Office Action mailed Jan. 2, 2013 in corresponding U.S. Appl. No. 12/792,294.
Tempco Electric Heater Corporation, VS Glow Infrared Heaters, p. 3, www.tempco.com/Infrared/VSGlowWeb.pdf, 2006/2007 Handbook, 5 pages.
Office Action mailed May 22, 2013 in corresponding U.S. Appl. No. 13/676,508.
Final Rejection mailed Jun. 20, 2013 in corresponding U.S. Appl. No. 12/792,294.
Final Rejection mailed Apr. 29, 2015 in corresponding U.S. Appl. No. 12/792,294.
Final Rejection mailed Jul. 6, 2015 in corresponding U.S. Appl. No. 13/676,508.
Australian communication issued Jun. 19, 2015 in corresponding Australian patent application No. 2014203812.
Japanese communication, with English translation, mailed Jun. 23, 2015 in corresponding Japanese patent application No. 2014-090636.
McGraw-Hill Book Company; Traybal, Robert E.; "Mass-Transfer Operations", 2nd Ed.; pp. 191-193; 1968; New York.
Australian communication issued May 3, 2013 in corresponding Australian patent application No. 2013202509.
Australian communication issued Nov. 8, 2013 in corresponding Australian patent application No. 2013202509.
Australian communication issued Jul. 23, 2014 in corresponding Australian patent application No. 2013206057.
Office Action mailed Sep. 15, 2014 in corresponding U.S. Appl. No. 12/792,294.
Final Rejection mailed Jul. 30, 2014 in corresponding U.S. Appl. No. 13/676,508.
European communication dated Aug. 10, 2015 in corresponding European patent application No. 15165027.2.
Notice of Allownace mailed Sep. 4, 2015 in co-pending U.S. Appl. No. 12/792,294.
Office Action mailed Sep. 22, 2015 in co-pending U.S. Appl. No. 14/263,059.
Office Action mailed Oct. 2, 2013 in corresponding U.S. Appl. No. 12/792,294.
Australian communication, Patent Examination Report No. 1, issued May 3, 2013 in corresponding Australian Patent Application No. 2013202508.
Australian communication, Patent Examination Report No. 2, issued Sep. 18, 2013 in corresponding Australian Patent Application No. 2013202508.
Final Rejection mailed Feb. 21, 2014 in corresponding U.S. Appl. No. 12/792,294.
Office Action mailed Dec. 19, 2014 in corresponding U.S. Appl. No. 13/676,508.
Japanese communication, with English translation, dated Apr. 19, 2016 in corresponding Japanese patent application No. 2014-090636.
Japanese communication, with English translation, dated Dec. 21, 2015 in corresponding Japanese patent application No. 2014-250422.
Office action mailed Jan. 22, 2016 in co-pending U.S. Appl. No. 13/676,508.
Office action mailed Feb. 10, 2016 in co-pending U.S. Appl. No. 14/263,059.
Canadian communication, dated Mar. 10, 2016 in corresponding Canadian patent application No. 2,759,107.
European communication dated Apr. 14, 2016 in corresponding European patent application No. 14186655.8.
Canadian communication dated Oct. 31, 2016 in corresponding Canadian patent application No. 2,904,511.
Office action mailed Jul. 19, 2016 in co-pending U.S. Appl. No. 13/676,508.
Final rejection mailed Jan. 20, 2017 in co-pending U.S. Appl. No. 13/676,508.
Final rejection mailed Aug. 22, 2016 in co-pending U.S. Appl. No. 14/263,059.
Office action mailed Dec. 13, 2016 in co-pending U.S. Appl. No. 14/263,059.
Extended European Search Report mailed Jul. 31, 2013 in corresponding European patent application No. EP 13169131.3.
Office Action mailed Jan. 16, 2014 in corresponding U.S. Appl. No. 13/676,508.
Final rejection dated Apr. 6, 2017 in co-pending U.S. Appl. No. 14/263,059.

\* cited by examiner

INFRARED FLOAT BAR

This application is a divisional of U.S. Ser. No. 12/792,294 filed Jun. 2, 2010, which claims priority of provisional application Ser. No. 61/184,353 filed Jun. 5, 2009, the disclosures of which are hereby incorporated by reference.

BACKGROUND

Embodiments disclosed herein relate to an air float bar for use in positioning, drying or curing a continuous generally planar flexible material such as a web, printed web, newsprint, film material, or plastic sheet. More particularly, they pertain to an air float bar whose pressure pad area includes an infrared light source, such as an infrared bulb, a reflector surface and a lens to enhance accelerated infrared heating of web material to cause solvent evaporation, drying and/or curing. Electromagnetic infrared heat energy in combination with jets of air impinging upon the web surface provide for concentrated heating of the web material, thereby providing subsequent rapid evaporation, drying and/or curing from the surface of the material.

U.S. Pat. No. 5,035,066 (Wimberger) teaches the integration of an infrared emitter into a Coanda-type flotation air bar. Cooling air is brought through a channel assembly that encloses the emitter. A quartz lens is used to enclose the emitter while allowing transmission of electromagnetic energy in the range of infrared wavelengths to pass from the channel assembly enclosure to the web. In one embodiment, said cooling air, after passing around the emitter inside said channel assembly, is discharged through holes in a quartz lens of said emitter channel assembly. Although this arrangement provides some recovery of heat by discharging said cooling air to the web surface after flowing around said emitter, the flow path is not optimized for both cooling of the emitter and recovering of heat to the air which is subsequently impinged on the web. The prior art arrangement with passage of air through holes in the quartz lens does not provide optimum fluid contact to effectively cool the emitter and lens as is desired in order to maintain longevity of these components against thermal degradation or contamination. Nor does it maximize the recovery of heat from the emitter, lens and reflector. It is further desirable to keep the emitter and lens free from contamination by aggressive solvent vapors, liquids such as inks and/or coating materials, and other contaminants such as paper dust or chards of material from broken webs. Cooling and prevention of contamination of the reflector is also desirable for the same reasons as discussed for the lens. If such contamination occurs, the infrared energy is absorbed by the quartz material of the emitter and quartz lens instead of being transmitted through said quartz to the web surface, which results in loss of drying and heat transfer efficiency, and also promotes thermal degradation as the design temperatures of the emitter and lens materials may easily be exceeded. Similarly, contamination will reduce the reflectivity of the reflector resulting in loss of drying and heat transfer efficiency and material thermal degradation.

As is known to those skilled in the art of infrared dryers, it is desired to prevent possible ignition of combustible materials, such a paper web, should said combustible materials come into contact with hot surfaces. It is further desired to have a quick acting means of interrupting the heat flux from the infrared emitter from reaching the web to prevent ignition of a stationary or broken web. A means of blocking the infrared heat flux is taught in U.S. Pat. Nos. 6,049,995 and 6,195,909 (Rogne et al.) but requires detection and an active mechanical means to assure that the web is not exposed to temperatures exceeding the ignition temperature of materials being processed. As is known to those skilled in the art, it is often desirable to use fast-cooling tungsten or carbon filament emitters as are available from Heraeus Noblelight of Hanau, Germany. These fast-cooling elements minimize the time necessary to bring the infrared heat flux and associated surface temperatures low enough avoid ignition of said combustible materials should the web stop or break during an upset to the drying process. Even with such quick cooling emitters, it is desirable to keep the exposed surfaces of the air float bar as cool as possible at all times to prevent possible ignition of said combustible materials, even when web stoppage or a web breakage upset may go undetected.

It is also known to those skilled in the art of drying materials by means of infrared energy that the amount of heat effectively absorbed by the material is dependant on a number of key factors, including the temperature of the emitter, the geometry defining the infrared light paths to the materials, and the absorption characteristic of the materials to be dried. It is desired to select an emitter type such that its temperature will emit maximum electromagnetic energy flux in the range of wavelengths that correspond with the wavelengths of maximum absorption in the material to be dried. In the case of a coated web the materials typically include the base web substrate, and a coating comprised of solids, and a solvent such as water or an organic solvent, said solvent to be dried. Each of these materials exhibits an infrared absorption characteristic as a function of infrared wavelength, or spectra, which is to be considered in the selection of the type of emitter to be used.

In some cases, such as printing, the coating or ink is not applied to the substrate uniformly in all areas. It such cases it is desirable to maximize the infrared energy flux to the areas having coating or ink while minimizing the energy flow to uncoated (unprinted) areas. The locations of the coated and uncoated areas are variable according to the product to be dried. One prior art method used to effect the direction of drying energy to areas requiring drying while limiting energy to areas not requiring drying prescribes the selection of the emitter such that it will provide high infrared heat flux at a range of wavelengths that match high absorption wavelengths for the solvent, while minimizing the emission of infrared energy at wavelengths where absorption in the dry solids and the substrate is low. Another prior art method arranges a plurality of emitter lamps in an array wherein the emitter lamps may be activated (energized) or deactivated (de-energized) to emit infrared energy approximately matching the physical location of the areas to be dried. In the drying of moving continuous webs having widely variable patterns of printed and unprinted areas, this method of activating and deactivating a fixed array is only practically capable of directing drying energy on a spatially coarse scale. The infrared energy can be applied more or less in lanes along the length of the web to be dried, which does not address the need to limit drying heat to the unprinted areas that lie between printed areas along the direction of web travel.

SUMMARY

The embodiments disclosed herein offer an improvement over the prior art by guiding the cooling air in a path which maximizes the cooling of an emitter, an optional lens and reflector surfaces while providing additional convective heat transfer to the web and additional web flotation support, while shielding surfaces of said emitter, lens and reflector from contaminants described earlier. Exposed surfaces of the air float bar are kept at the lowest possible temperature to minimize the risk of ignition of the web or other materials being processed without the use of mechanical shutters or shields.

The general purpose of the embodiments disclosed is to provide an infrared air float bar for use in the heating and/or drying of webs, such as for use in a web dryer. The design of the air float bar element may be selected from several types as are known to those skilled in the art. Example designs of float bars are taught by Frost, U.S. Pat. No. 3,549,070, and Rocheleau, U.S. Publ. No. 2005/223593, but it is to be understood that the flotation bar element of the present invention is not limited to these particular examples. Included are one or more infrared emitters integrated into the air float bar for the generation and transmission of infrared electromagnetic radiation to the web, and additional heat is transferred to the web by convection air having been heated convectively in the process of cooling the emitter and associated reflector and lens elements.

It can be appreciated by those skilled in the art that air flotation bars provide convective heat and/or mass transfer owing to the action of the air jets on the web as it is floatingly supported in an array of one or more air bars. The air supplied to said jets may be heated by an independent heat source, such as an electric resistance coil, hot oil or steam coil, or a burner located in the ducting supplying the air to one or more air bars in the dryer. In the case of an infrared air flotation bar, cooling air is heated by the infrared emitter, and thus heated becomes a medium for enhanced convection heat transfer and mass transfer to the web within the dryer. Said cooling air, now heated, may be brought in to convective contact with the web to enhance heat transfer. In embodiments disclosed herein, the cooling air path is arranged and the air flow mass adjusted to provide sufficient cooling to protect element surfaces as previously mentioned and to avoid potential ignition of web materials while maximizing the temperature and therefore the amount of useable energy taken up by the cooling air for use in heating and drying the web. Furthermore, the heated cooling air and flotation air jets are discharged and mingled in the area directly between the web and air bar and transfer heat convectively while floatingly supporting the web.

After convectively contacting the web, the combined air may be drawn back to the air supply of the dryer and a portion re-circulated again to supply the one or more air bars. Energy consumption to run the dryer is minimized when the amount of air re-circulated is maximized. The exhaust ventilation rate, that is the balance of air not re-circulated, may be set by those skilled in the art of drying to maintain a desired wet bulb temperature within the dryer such that the drying rate is maximized. Typically in the case of drying non-flammable solvents such as water, the re-circulation rate may be maximized to a high level, often in the range of 50 to 95% of the total convection drying air flow supplied to the air bars. In the case of flammable solvents, the ventilation rate is most often set to meet the ventilation safety requirements requiring the dryer to operate well below, typically 25% of, the lower explosive limit concentration of the solvent or solvents being dried. In a preferred embodiment, the supply air to one or more infrared flotation air bars nozzles is heated only by the infrared emitter elements, that is no other independent heater is required to heat the supply air, this saving space and component costs for air handling equipment. In a most preferred embodiment, by maximizing the re-circulated air within the dryer in a range from 70 to 95%, the convection air supplied to the infrared flotation nozzles may be heated to a desired temperature, preferably in the range of 150 to 300° F. for drying of water-based coatings and inks.

In a further embodiment, the flow and temperature of the air supplied to the infrared air bar is regulated to obtain a desired convection heat flux to complement the infrared heat flux to the web being dried. This provides a unique means to preferentially direct the heating of the web while drying both wet and dry areas on the same web, as in the case of printing. While drying under conditions of constant infrared emitter temperature and constant convection air velocity and temperature, the wet areas of the web are substantially cooled by the evaporative energy needed to vaporize the solvent, such as water. As is well known to those skilled in drying, the wet areas tend to approach the wet bulb temperature and remain at approximately that temperature during the constant rate drying period, until sufficient liquid is evaporated and the evaporation rate is limited by the falling rate drying period. Upon entering the falling rate drying period, the web temperature then climbs as the evaporative cooling diminishes. In the case of printing, some areas of the web are heavily covered with ink while some areas may have little or no coverage. These low coverage areas are relatively dry and often enter the falling rate drying period almost immediately upon entering the dryer. Thus the web temperature in these areas increases significantly in contrast to relatively wet areas, and often reaches a temperature at the exit of the dryer which exceeds the desired level. This may result in damage to the web product as well as wasting energy in overheating these areas.

In embodiments disclosed herein, the high convection heat transfer characteristic of the infrared flotation bars is applied in combination with infrared radiation mode such that the web temperature difference between relatively wet and dry areas at the exit of the dryer may be reduced. This is accomplished by the combined action of the two heat transfer modes: convection and radiation. Those skilled in the art of heat transfer recognize that the heat flux via the two modes act simultaneously and the contribution from each mode may be additive or work opposite to another. That is, while infrared energy is heating an object, it may at the same time be losing heat via convection. It is an object of the embodiments disclosed herein to provide a balance of the two aforementioned heat flux modes such that the overheating of relatively dry areas, such, as non-printed areas is avoided or mitigated without the limitations of prior art already described.

Typically when the web first enters the dryer, it is cooler than the air temperature and thus effectively heated additively by both radiation and convection modes. As the web increases in temperature, especially in relatively dry (low coverage) areas, the infrared energy continues to heat the web, but as the web temperature eventually exceeds the regulated air temperature in the dry areas, the convection heat transfer now acts opposite to the infrared radiation and the air tends to keep those areas of the web relatively cooler. Meanwhile, the wetter areas (higher coverage) will remain at a lower temperature (below the regulated air temperature) owing to the evaporative cooling effect previously described. Consequently, the drying rate is enhanced by both heat transfer modes in the wetter areas from heating by both radiation and convection. By regulation of the air temperature to a level just above the wet bulb temperature in the dryer, the combined infrared and convection drying characteristics of the present invention a selective drying condition is enabled wherein fast drying is promoted in high coverage areas while mitigating the tendency to overheat the web in low coverage areas.

In prior art, the only requirement of the cooling air has been to limit the temperature of the emitter and associated elements such as the reflector and lens. As mentioned above it is an object of the embodiments disclosed herein to regulate the temperature of the air supplied to the infrared air bar to meet a web temperature heating balance in wet versus dry areas. As the cooling air temperature is now desired to be a regulated variable, this places additional design requirements on the embodiment of the cooling provisions for emitter and associated elements. In the embodiments described herein, the cooling air flow volume and path take into consideration this variation in air temperature. Looking more specifically to the design of the infrared air bar, infrared electromagnetic energy waves pass from an emitter filament by transmission in a straightforward direct manner to impinge on a traversing web. Said infrared waves pass transmissively through the emitter bulb casing used to hold and protect the filament, and through a planar lens. The bulb casing and lens materials are typically of quartz material having transmissive properties in the wavelength range of infrared electromagnetic energy. Infrared electromagnetic waves are also reflected in an indirect manner from the emitter to a reflector surface that reflects the waves, which then further pass through the planar lens to impinge upon the traversing web. As is known to those skilled in the art of infrared energy, a portion of the electromagnetic energy that enters a transmissive material or impinges on a reflective surface is absorbed. This absorbed energy raises the temperature of the transmissive or reflective material and may lead to degradation of the transmissive or reflective property, substantially reducing the energy reaching the web, and also result in early failure of the emitter and lens material. This energy is useful in heating and drying the web when recovered in an air stream, which is then brought into fluid contact with the web. Energy recovery and cooling effectiveness are maximized when carried out in a manner that provides uniform fluid contact with a controlled quantity of air. Optimization of the present embodiments has shown that this can be accomplished by passing from 5 to 40%, preferably from 7 to 15%, of the total air supply delivered under pressure to the floater bar through an air distribution means into uniform fluid contact with the emitter bulb, and further uniformly guide the flow path in fluid contact over the surface of the reflector, and further into uniform fluid contact with both faces of the planar lens. Most preferably, this flow of cooling air is in the range of 7 to 15% of the total supply air to the floater bar. In addition, the uniform fluid contact of cooling air with the emitter bulb, reflector and lens surfaces prevent contamination by solvents and other materials mentioned previously.

In certain embodiments, there is disclosed a channel assembly adapted to be inserted or retrofitted into an air bar, wherein the channel assembly has a compartment defined by a bottom having at least one aperture and a pair of opposing sides, the compartment comprising an infrared light source, a reflector of infrared light, and a lens transmissive to infrared light. The aperture allows for the flow of cooling fluid about the infrared light source, reflector and lens in the compartment. The removable channel assembly is configured for replacement of the infrared emitter and to allow the setting of the pressurized cooling air flow to the optimum level. Thus, the channel can be removed and the infrared light source replaced or repaired, and the channel then reinserted into the air bar, or the channel can be removed and a new channel can be inserted into the air bar.

In a preferred embodiment, the setting of the flow of cooling air through the at least one aperture is adjustable. The flow through the at least one aperture is set by an adjustment of a moveable element in relation to a fixed element, so as to allow an increase or a decrease in the aperture flow area of the combined moveable and stationary elements. This setting is made by adjusting the position of said movable element to obtain sufficient cooling of the emitter and associated elements with the maximum regulation setting for the supply air temperature in order to avoid thermal degradation of the materials selected. In addition the cooling air flow is set to maintain the surface temperatures of the lens and air bar and other surfaces that may contact the web, should the web break or otherwise lose tension, to a temperature below the ignition temperature of the web material, preferably <400° F. The practical range for the cooling air flow setting has been found to be from 5 to 40%, most preferably 7 to 15%, of the total supply air delivered to the infrared air bar.

DETAILED DESCRIPTION

In general, the float bars disclosed herein have one or more primary air jets which discharge from slots. The primary jets create a pressure field to floatingly support a web. The air supplied to the primary jets may be optionally heated to enhance heat and/or mass transfer for drying of the web. Air for cooling the emitter, reflector and lens elements contained in a removable channel may be taken from the same supply plenum as the primary flotation air, or alternately ducted from a separate air source to the channel assembly. After contacting the emitter, reflector and optional planar lens, the cooling air is discharged through one or more secondary jets which sweep the face of the planar lens and prevent contact of the web and solvent materials from the lens.

Figure 1:
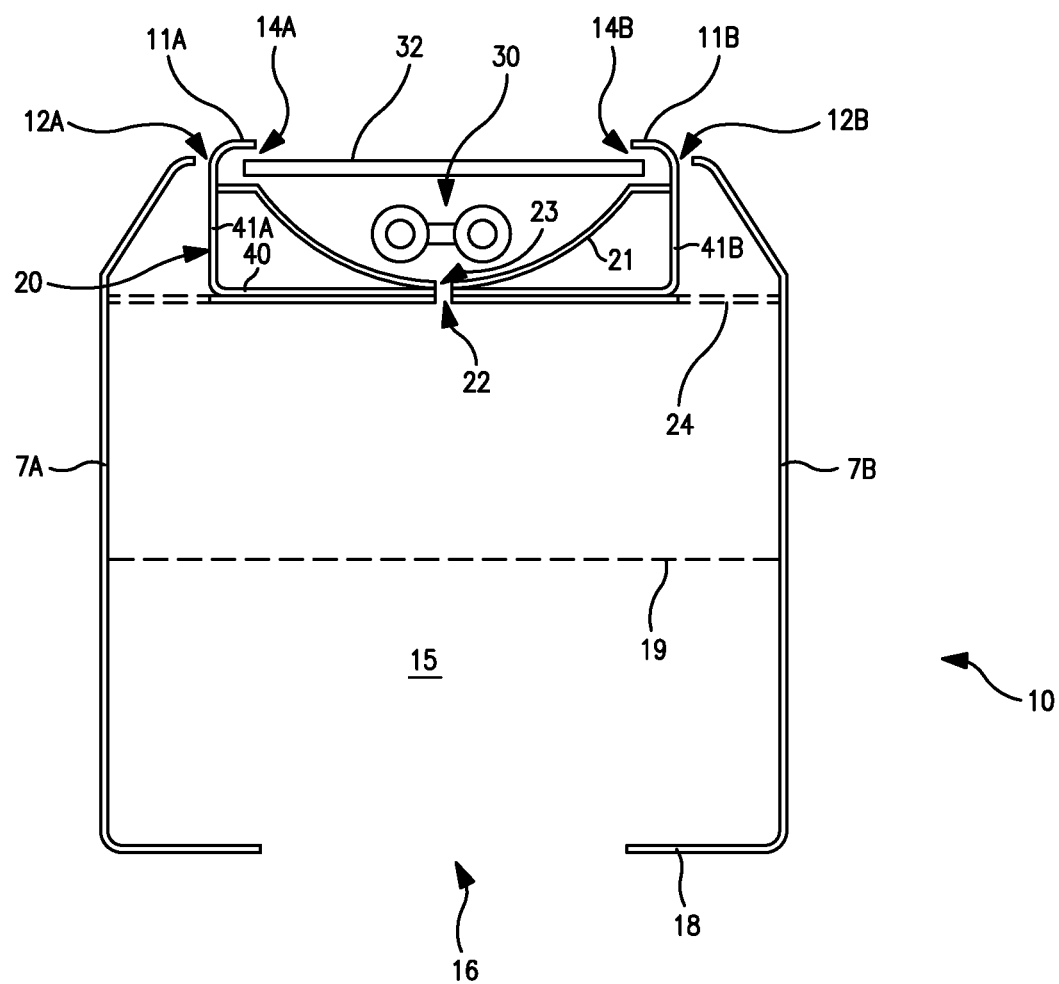
FIG. 1 is a cross-sectional view of an IR float bar in accordance with certain embodiments.
Figure 2:
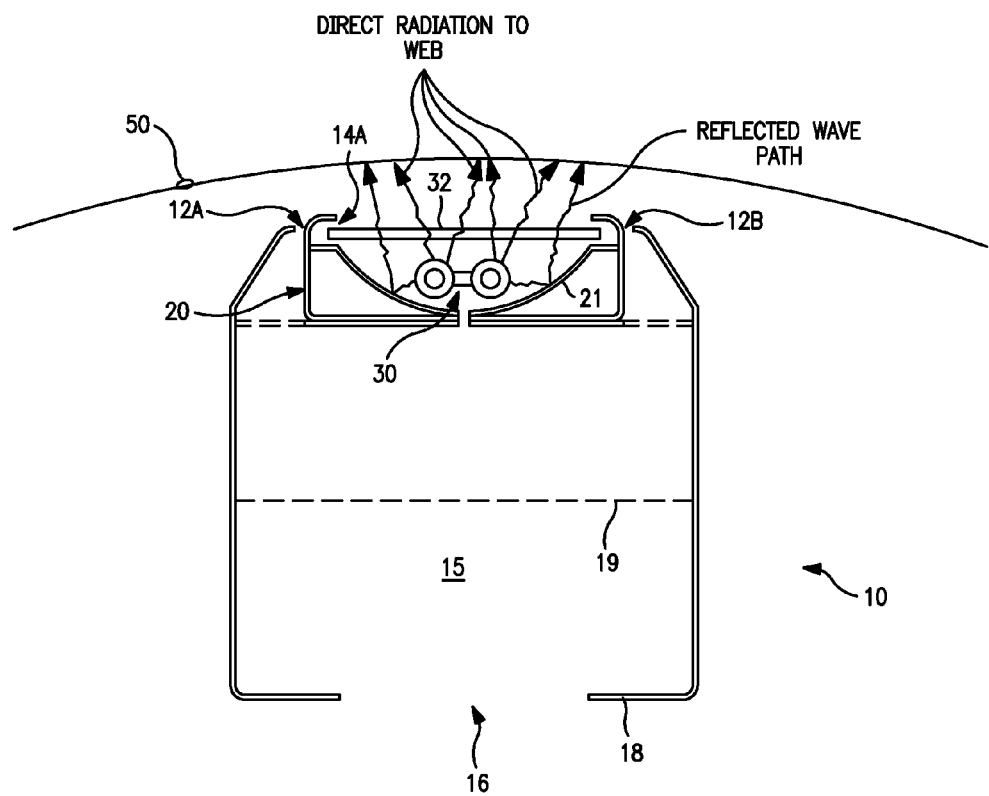
FIG. 2 is a cross-sectional view of the IR float bar of FIG. 1 showing infrared energy waves.

FIGS. 1 and 2 show a preferred embodiment wherein the floater bar element 10 is of the Coanda type having two primary flotation jets; a first primary flotation slot 12A and a second primary flotation slot 12B. Two secondary air slots 14A and 14B, that are preferably 5 to 40% of the primary slots 12A, 12B, most preferably 15 to 30% are also provided as shown. Supply air enters the supply plenum 15 of the air bar 10 via a supply air feed inlet 16 (e.g., a plurality of oval shaped apertures) located at the bottom 18 of the air bar 10 and is distributed along the length of the air bar to obtain suitable distribution to the flotation jets as is known in the art. An infrared element is configured as a channel assembly comprised of a supporting channel 20 which contains a reflector 21 in fluid communication with the supply air plenum 15, or a separate cooling air source as mentioned earlier, by means of one or more apertures 22 which penetrate the base channel and are in substantial alignment with comparable apertures 23 in the reflector 21 at the point of tangent contact with the base channel 20. The total area of the apertures is preferably equivalent in flow area to 20 to 100% of the area of the primary flotation slots 12A, 12B, that is, slot length×slot width×number of slots. The active area of the apertures may be adjusted by aligning the array of apertures in the reflector 21 with a comparable array of apertures in the base channel 20, ranging from full alignment to complete closure, thus acting as an adjustable damper for setting of the cooling air flow. Suitable mechanical means of sliding the reflector with respect to the base channel to achieve the desired alignment can easily be accomplished by those skilled in the art.

Figure 8A:
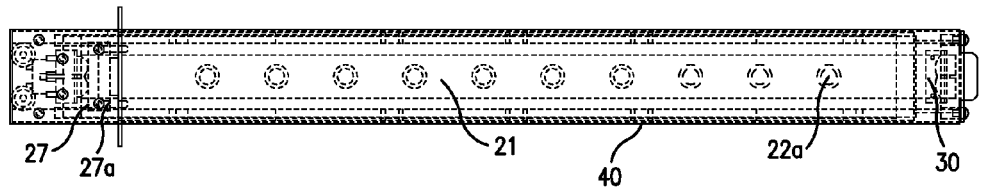
FIG. 8A is a top view of an air bar showing an air flow adjustment mechanism in accordance with certain embodiments.
Figure 8B:
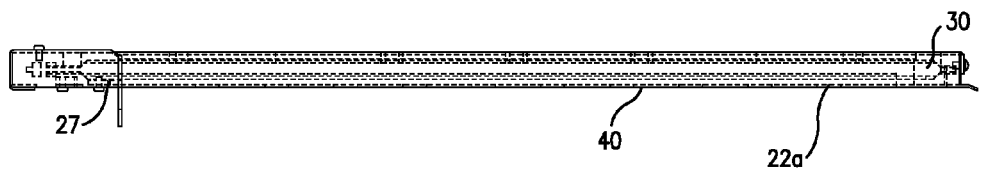
FIG. 8B is a side view of an air bar showing an air flow adjustment mechanism in accordance with certain embodiments.
Figure 8C:
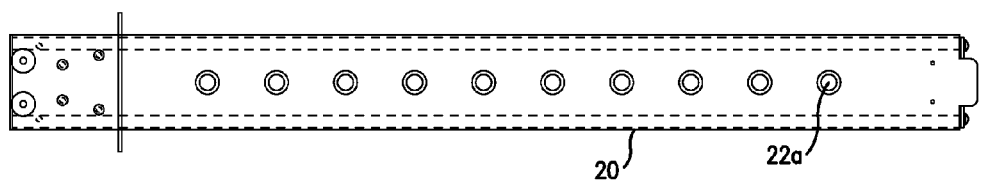
FIG. 8C is a bottom view of an air bar showing an air flow adjustment mechanism in accordance with certain embodiments.
Figure 8D:
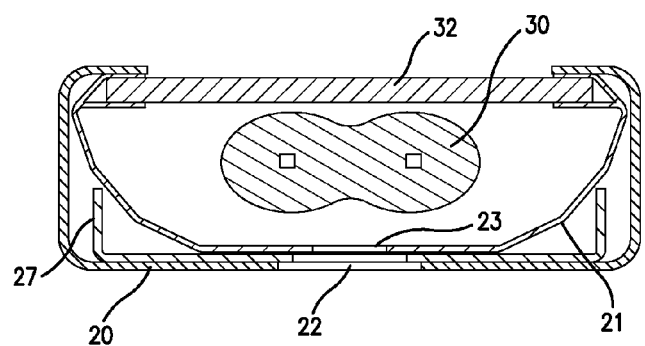
FIG. 8D is an end cross-sectional view of an air bar showing an air flow adjustment mechanism in accordance with certain embodiments.
Figure 9A:
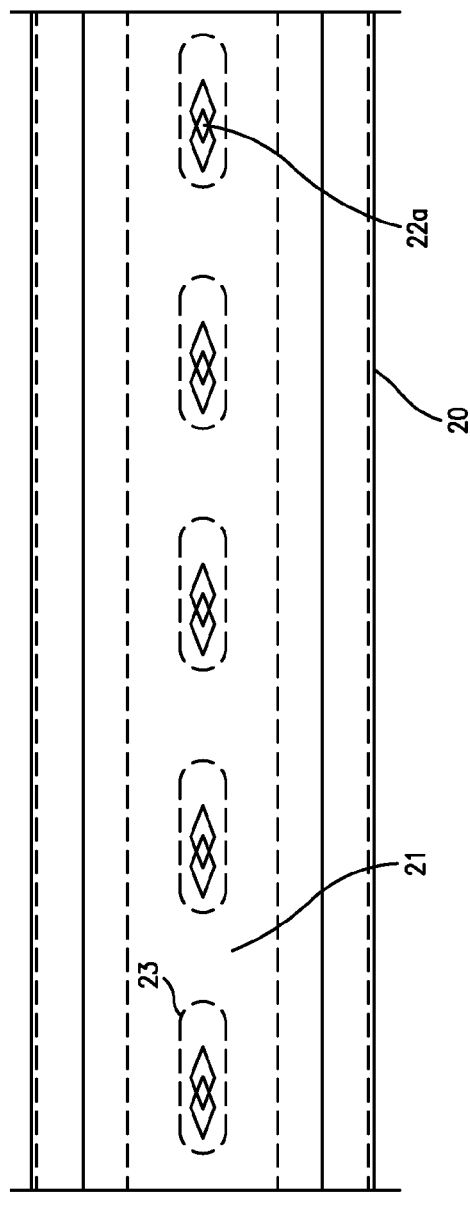
FIG. 9A is a top view of an air bar showing an air flow adjustment mechanism in accordance with certain embodiments.
Figure 9B:
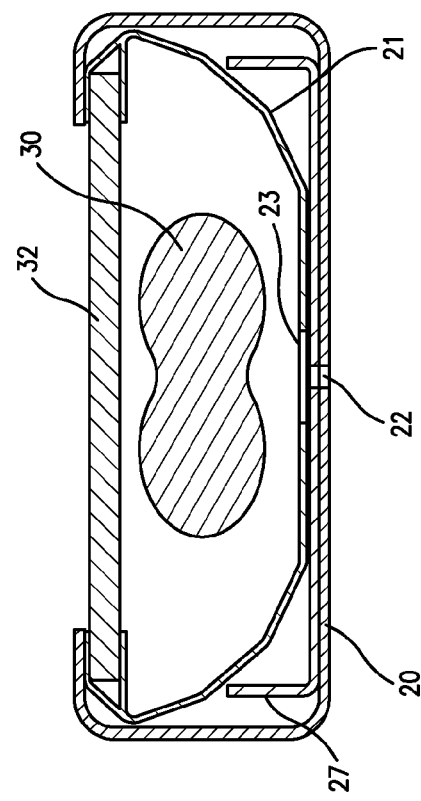
FIG. 9B is an end cross-sectional view of an air bar showing an air flow adjustment mechanism in accordance with certain embodiments.

FIGS. 8A-8D show preferred embodiments for the sliding and stationary elements in the channel assembly to enable the adjustment of the infrared emitter cooling air flow. FIGS. 8A and 8B show a sliding adjustment element 27 with circular apertures 22a that can be aligned with corresponding preferably larger apertures 22 in the removable channel 20. Corresponding oversized apertures are located in reflector element 21 such that these apertures coincide with the apertures 22 in removable channel 20. Sliding adjustment element 27 has adjustment slots 27a to allow the moveable element 27 to slide in position relative to reflector 21 and removable channel 20 such that the aperture 22 open area is reduced from the fully concentric alignment position. Once the appropriate position of the adjustment element is found, the adjustment element can be fixed in place such as by tightening bolts or the like in the slot 27a. FIGS. 9A and 9B show a more preferred embodiment wherein apertures 22a in the sliding adjustment element 27 and the apertures 22 in removable channel 20 are diamond shaped, thus allowing a finer adjustment of flow when moving the sliding adjustment element when reducing the aperture 22 flow area. Apertures 23 in the reflector 21 are oblong.

The removable channel 20 includes a bottom member 40 that is supported on distribution member 24, and opposite side members 41A, 41B that each terminate in inwardly facing terminal ends 11A, 11B. The outer surface of the chamber 20 transitioning between the sides 41A, 41B and the respective terminal ends 11A, 11B are curved so as to define, with the corresponding terminal ends of the sides 7A, 7B of the air bar 10, Coanda slots, which are the primary flotation slots 12A, 12B. The removable channel 20 can be slidingly removed from the air bar 10, along with its contents, and either be replaced by another channel, or by the same channel after maintenance or replacement of the lens and/or bulb contained therein.

An initial air distribution member 19, such as a perforated plate, can be provided in the air bar 10 to enhance uniform supply air distribution. An open area of about 13% in such a member has been found to be suitable. A secondary air distribution member 24, such as plate perforated with slots or holes, can be positioned downstream of the initial air distribution member 19 as shown, and also can serve to support the removable channel 20.

The channel 20 contains an infrared light source 30, such as an IR emitter bulb commercially available from Heraeus Noblelight GmbH. A lens 32, preferably a planar quartz lens, can be positioned above the IR light source 30 as shown. The lens encloses the emitter while allowing transmission of electromagnetic energy in the range of infrared wavelengths to pass through and reach the web 50 floating above the bar 10 (FIG. 2). Electromagnetic energy emitted from the IR light source 30 passes through the lens 32 and directly radiates onto the web 50. A reflector 21 is also contained in the channel 20, and is preferably parabolic and made of a suitable reflective material such as stainless steel or aluminum. Preferably the reflector 21 extends from the lens downwardly below the IR light source, thereby surrounding the IR light source except in the area occupied by the lens, so that light emitted from the light source radiates either directly through the lens or is reflected by the reflector towards the lens, and is then ultimately radiated onto the web 50, as shown diagrammatically in FIG. 2.

The secondary slots 14A, 14B are defined by the clearance (e.g., 0.0010" to 0.003") provided between the lens 32 and the inwardly facing terminal ends 11A, 11B of the chamber 20. As illustrated diagrammatically in FIG. 3, supply air fed into the air bar at inlet 16 flows through the perforated initial air distribution member 19, through perforated secondary air distribution member 24, out through primary flotation slots 12A, 12B where a pressure pad or field is created to floatingly support the web 50. Supply air also passes through the cooling air entry jets in the member 24, the bottom 40 of the channel 20, and the reflector 21, and flows in the area defined by the reflector 21 and the lens 32. That air thus cools the emitter 30, the reflector and the lens. The resulting heated air then flows out of the interior of the channel 20 through one of the secondary slots 14A, 14B, and sweeps the face of the lens 32, thereby preventing contact of the web and solvent materials and other debris or contaminants with the lens 32. Those skilled in the art will appreciate that the fluid for cooling the emitter, reflector and lens elements may be ducted from a separate air source to the channel assembly.

In certain embodiments, the lens 32 can be omitted, and the air discharged from the channel assembly can be used as a virtual lens, effectively shielding the emitter 30 from the web and potentially hazardous debris or contaminants.

Figure 4:
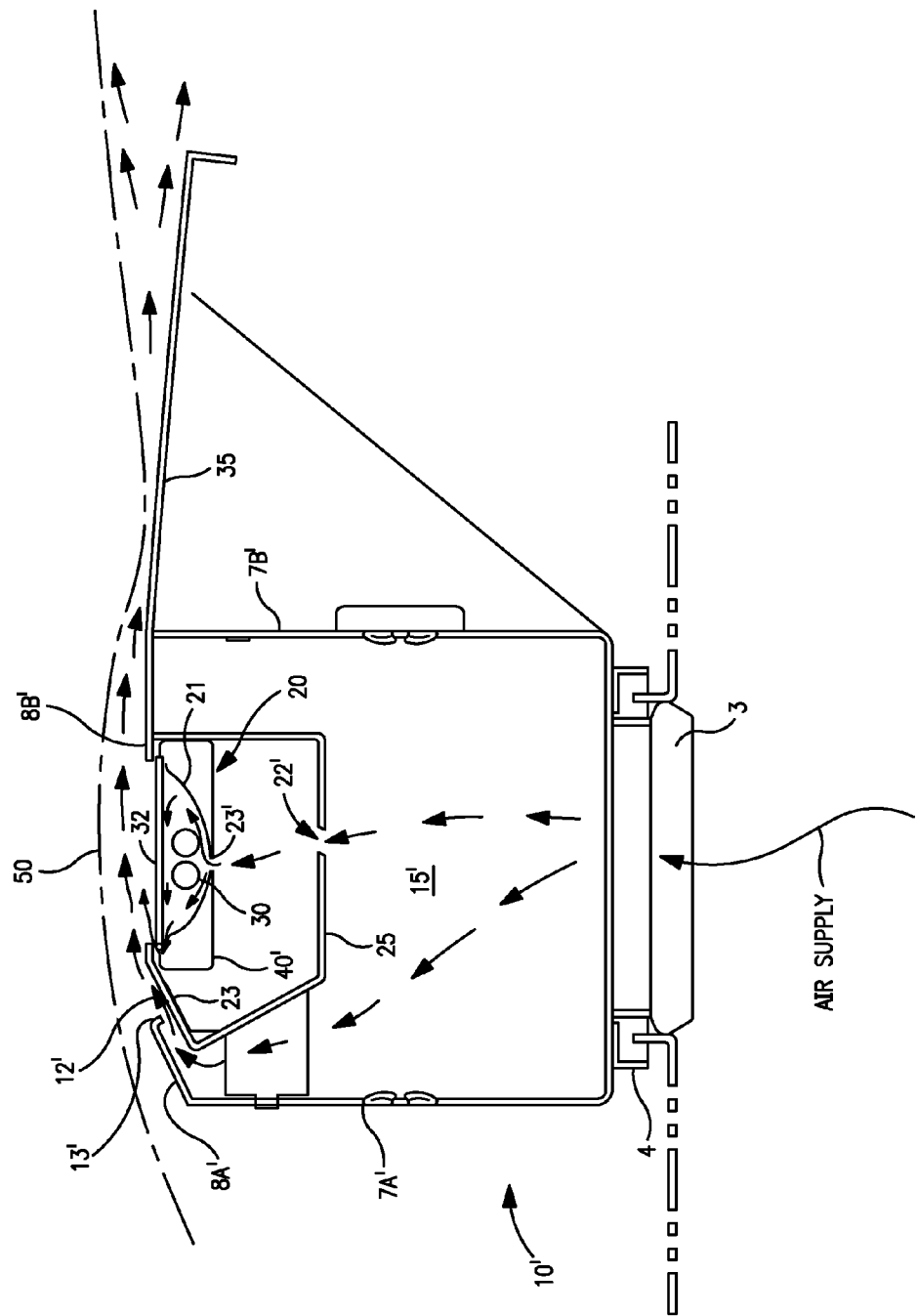
FIG. 4 is a cross-sectional view of a single-side flotation IR air foil in accordance with certain embodiments.

FIG. 4 illustrates an embodiment wherein the float bar is a single-side flotation air foil 10'. In this embodiment, a single primary flotation jet 12' is provided to discharge supply air to float the web 50, and a single secondary jet 14' is provided to discharge cooling air from the removable channel assembly 20'. The air foil 10' is defined in part by a header, which in the embodiment shown, is generally rectangular in cross-section except for its top portion. Opposite sides 7A', 7B' of the header terminate in respective top flange portions 8A', 8B'. Top flange portion 8A' is angled, preferably at about 65° relative to vertical, and terminates in a bent portion 13'. Top flange portion 8B' extends towards opposite side 7A' in a substantially horizontal fashion. The header defines an interior space 15' that serves as a plenum for the gas that is received via the one or more holes (not shown) at the base of the air foil 10' that are in gas-receiving communication with a gas supply (not shown). The header is positioned on suitable ducting by aligning the aligners 3 at each end plate of the header and is sealed by retainer gasket 4. A diffuser plate having a plurality of spaced holes can be positioned in the header to help distribute the supply of gas evenly as it flows towards the slots.

The flange portion 8A' and bent portion 13' of the header, together with the flat portion 23 of the member 25, defines the primary slot of the air foil. Air flows out the primary slot 12', and continues in the direction of web travel towards the wing 35 of the air foil, which wing 35 terminates in a flange 34 extending downwardly at a right angle about 0.5 inches. The air then travels along the top face of the wing in the direction of web travel to support the web. As in the embodiment of FIG. 1, an optionally removable channel assembly 20 is provided, and contains a reflector 21, a lens 32, and an IR light source 30. Air enters the channel assembly 20 through one or more apertures 22' in the member 25, each aligned with a respective aperture 23' in the bottom 40' of the channel 20, and cools the reflector 21, the light source 30, and the lens 32. The cooling air (now heated) is discharged from the channel 20 via the clearance between the lens 32 and the flat port 23.

Figure 5:
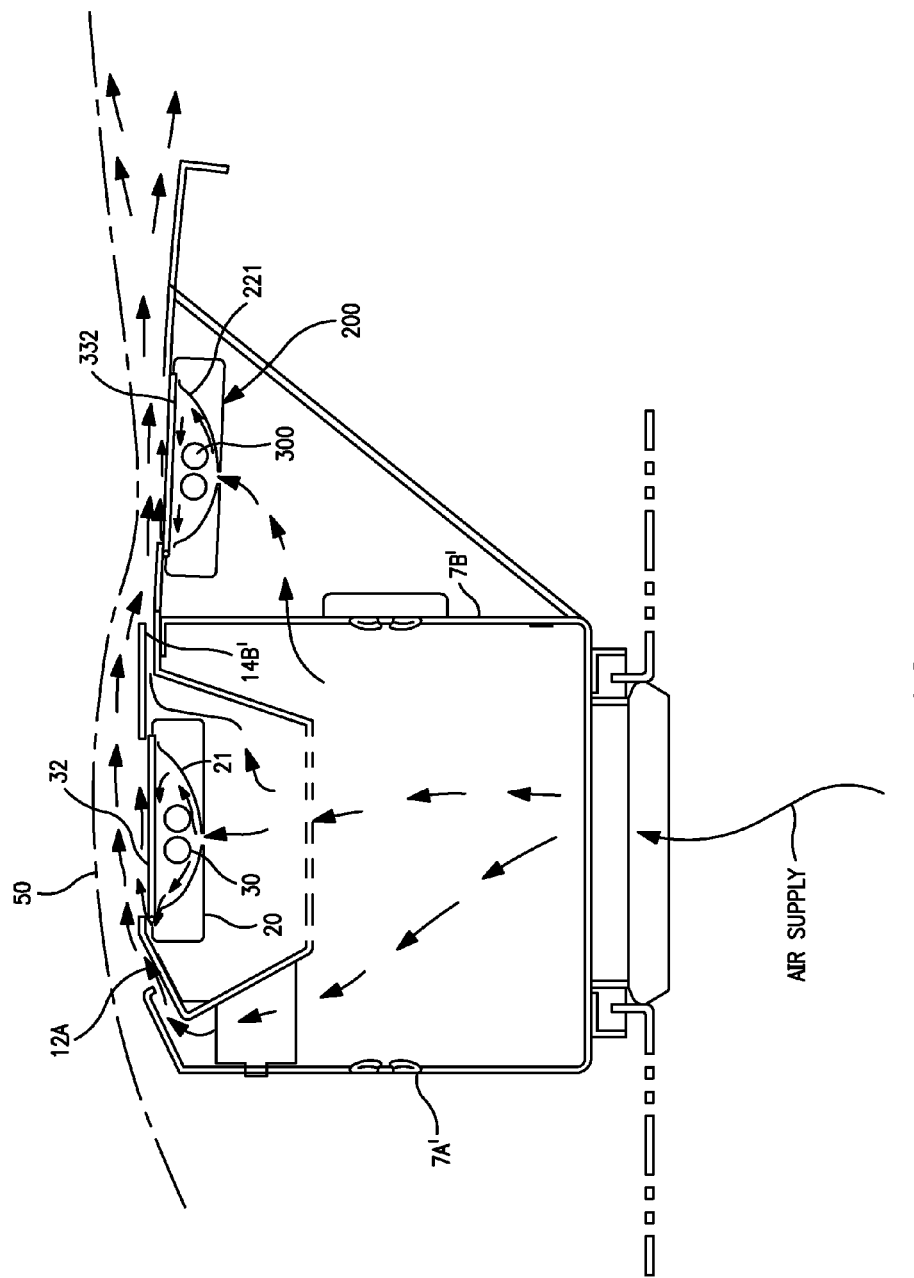
FIG. 5 is a cross-sectional view of a single-side flotation IR step foil in accordance with certain embodiments.

FIG. 5 illustrates an embodiment wherein the float bar is a single-side flotation step foil 10", such as that disclosed in U.S. Pat. No. 7,530,179, the disclosure of which is hereby incorporated by reference. Like the air foil 10' of FIG. 4, an optionally removable channel assembly 20 can be provided that contains the reflector 21, IR light source 30 and lens 32. Differences between the embodiment of FIG. 5 and that of FIG. 4 include in the FIG. 5 embodiment the provision of a second secondary slot 14B', spaced from and stepped down from the primary slot 12A, is to aid in floating the web 50. Air discharged from the secondary discharge slot 14B travels parallel to the web. Air discharged from the primary discharge slot 12A is gathered into the air stream of the secondary discharge slot 114B' in a direction parallel to the web transport direction. Between the primary discharge slot and the secondary discharge slot is a generally flat web support surface, including the face of the lens 32. Downstream of the secondary discharge slot, in the direction of web travel, is a second web support surface that comprises a wing portion that slopes downwardly as it extends away from the secondary discharge slot 14B'. This second web support surface optionally can include a second lens 332 that forms part of an optional second channel assembly 200 comprising a reflector 221, an IR light source 300, and the lens 332. the side 7B of the stepfoil can include one or more apertures 60 to allow supply air (or air from another source) to enter the channel assembly and cool the components therein as above.

Figure 7:
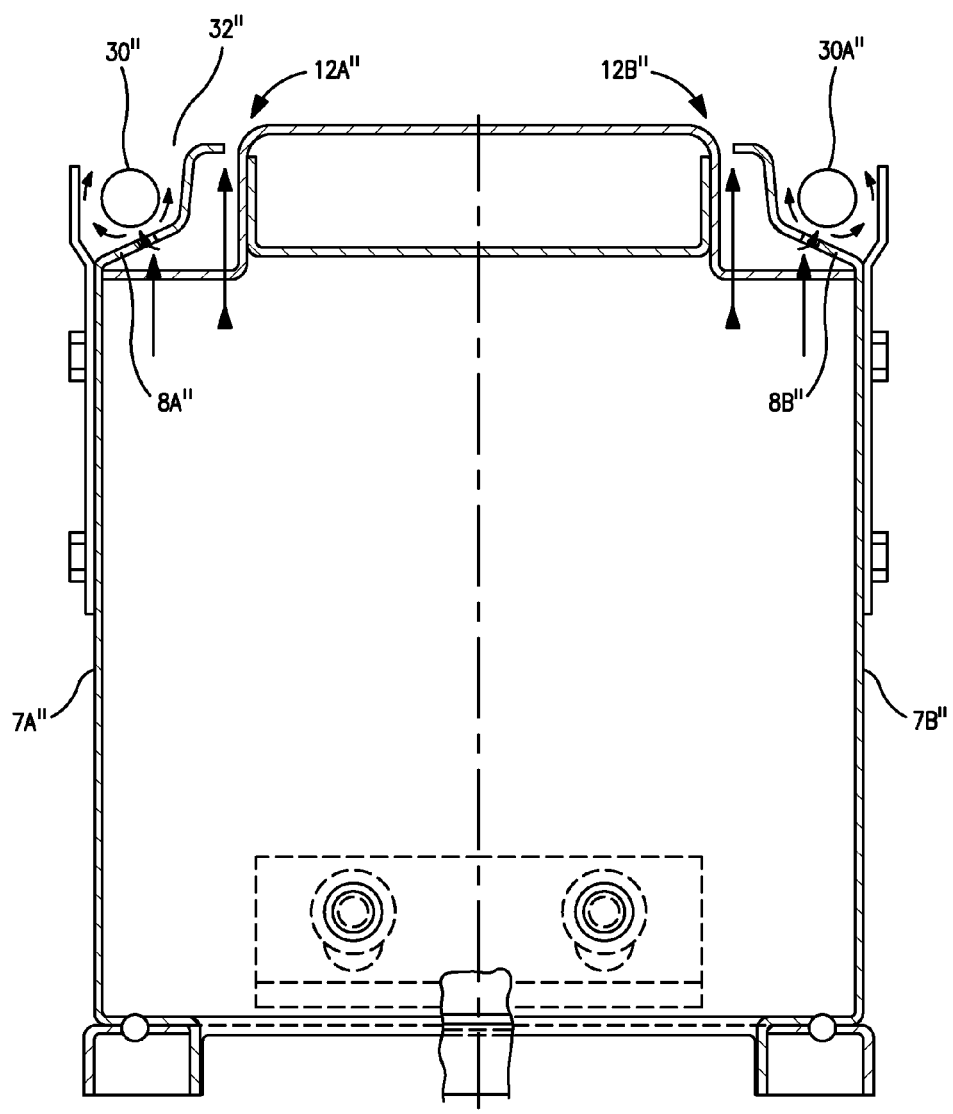
FIG. 7 is a cross-sectional view of a Coanda air float bar having two IR light sources in accordance with certain embodiments.

FIG. 7 illustrates a further embodiment, in a Coanda nozzle having two Coanda discharge slots 12A", 12B". In the embodiment shown, an IR light source 30" is positioned upstream, in the direction of web travel, of the first Coanda discharge slot 12A. Bent member 8A" that defined in part the Coanda discharge slot 12A" includes one or more apertures that allow air to pass through and flow about the IR light source 30" to cool the same. A lens 32" can be positioned above the light source 30" that is transmissive to electromagnetic energy, and if provided, the lens is also cooled by the flow of air that cools the light source 30". Alternatively, the cooling air can function as a virtual lens, keeping the light source 30" cool and free of debris and contaminants. A second IR light source 30A" can be positioned downstream, in the direct of web travel, of the second Coanda slot 12B", arranged in a manner similar to the upstream assembly. The downstream assembly is shown without a lens, although one could be used as in the upstream assembly.

FIGS. 6A-6D illustrate suitable arrangements of pluralities of infrared bars with respect to a traversing web 270. It is noted that the air bars shown are illustrative only; any of the air bar embodiments disclosed herein (e.g., Coanda, air foil, step foil, etc. can be used). Other arrangements are also possible.

Figure 6A:
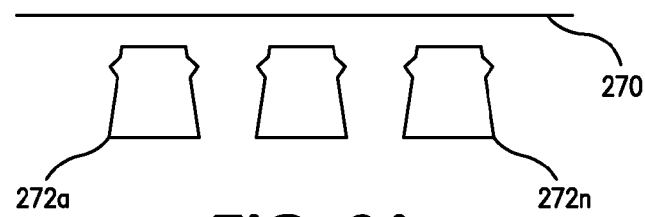
FIGS. 6A-6D are schematic illustrations of various IR bar configurations in accordance with certain embodiments.

FIG. 6A illustrates a plurality of infrared air bars 272a-272n positioned below a traversing web 270.

Figure 6B:
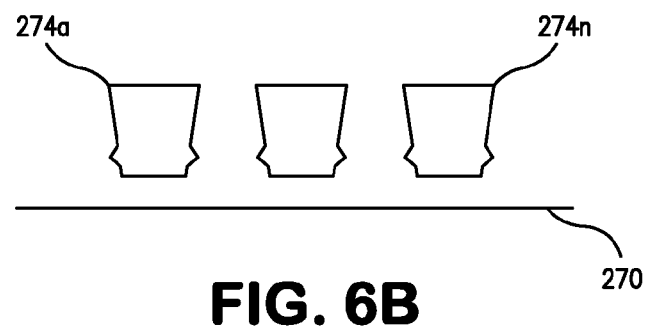

FIG. 6B illustrates a plurality of infrared air bars 274a-274n positioned above a traversing web 270.

Figure 6C:
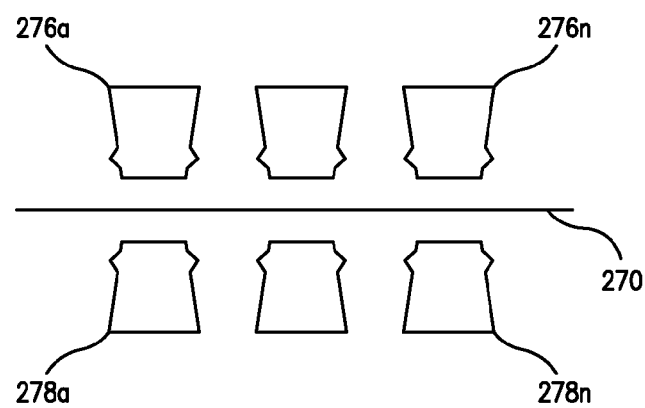

FIG. 6C illustrates a plurality of infrared air bars 276a-276n and a plurality of infrared air bars 278a-278n in an opposing vertically aligned arrangement about a traversing web 270 for rapid drying of the traversing web 270.

Figure 6D:
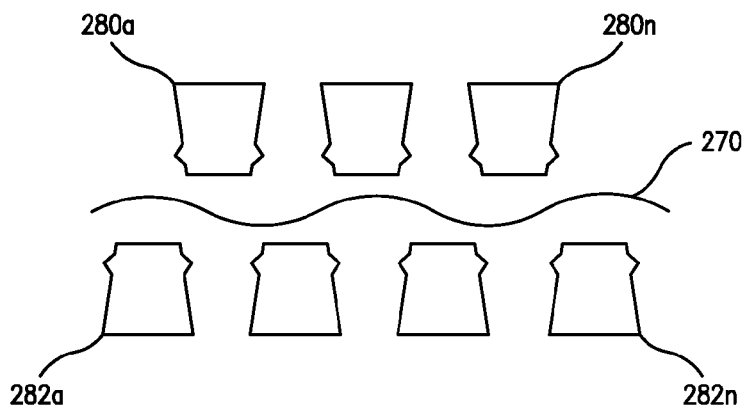

FIG. 6D illustrates a plurality of infrared air bars 280a-280n and a plurality of infrared air bars 282a-282n arranged in alternating opposing vertical arrangement about a traversing web 270 creating a sinusoidal shape for the traversing web 270.

FIGS. 10-13 illustrate preferred embodiments of infrared air float bars arranged in a dryer enclosure 301 having a web 270 entering said enclosure through web slot 305a and exiting through exit slot 305b, said web floatingly traverses through a combined convection and infrared radiation heating zone created by infrared air bars which direct infrared energy to the web and handle distribution of heated supply air jets to impinge on the web. The enclosure 301 contains the spent heated air after fluid contact with the web such that collection of at least a portion of the spent air may be recovered for re-circulation to the air bars. At least a portion of the spent air is exhausted from the enclosure as described in the embodiments herein.

Figure 10:
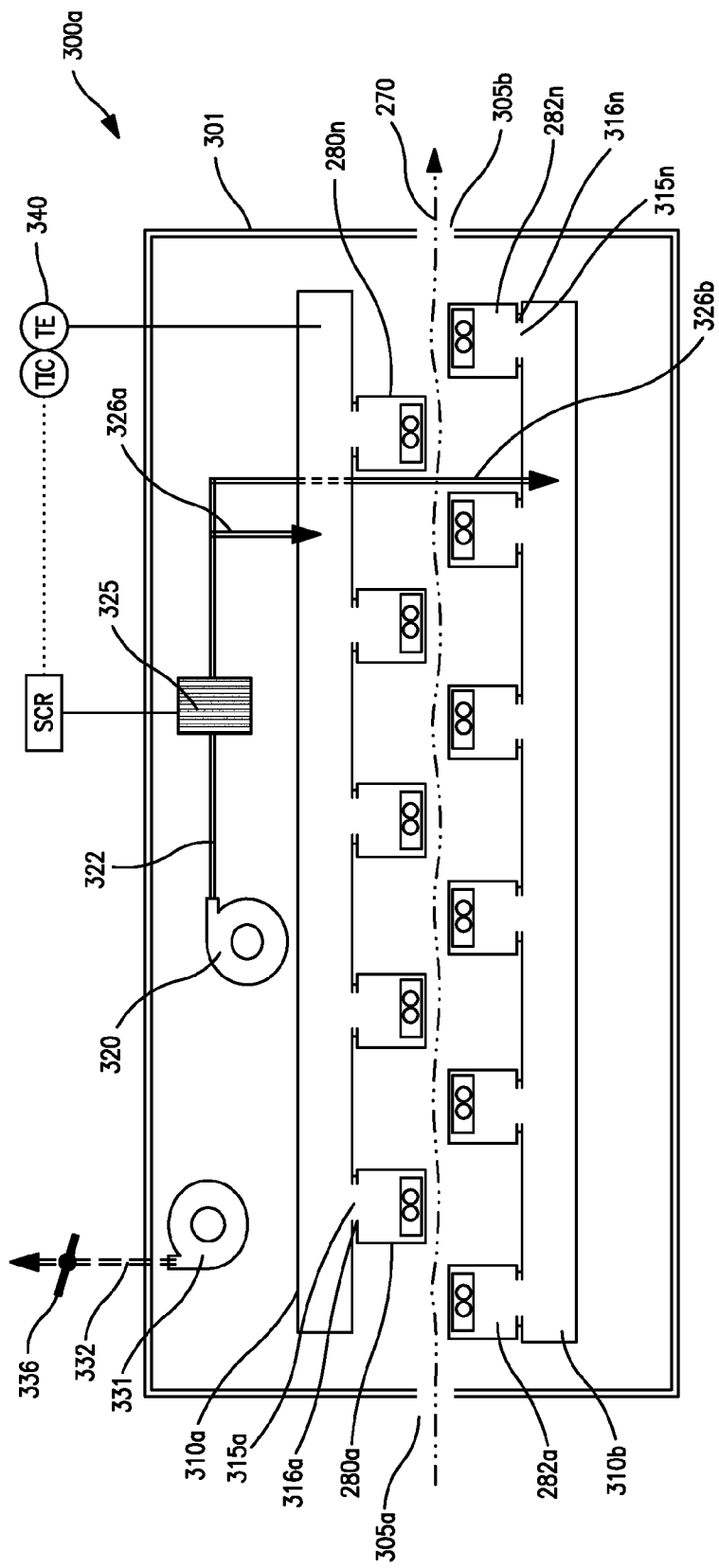
FIG. 10 is a schematic diagram of a dryer incorporating a plurality of IR float bars in conjunction with supply air, re-circulating air and exhaust air features in accordance with certain embodiments.
Figure 11:
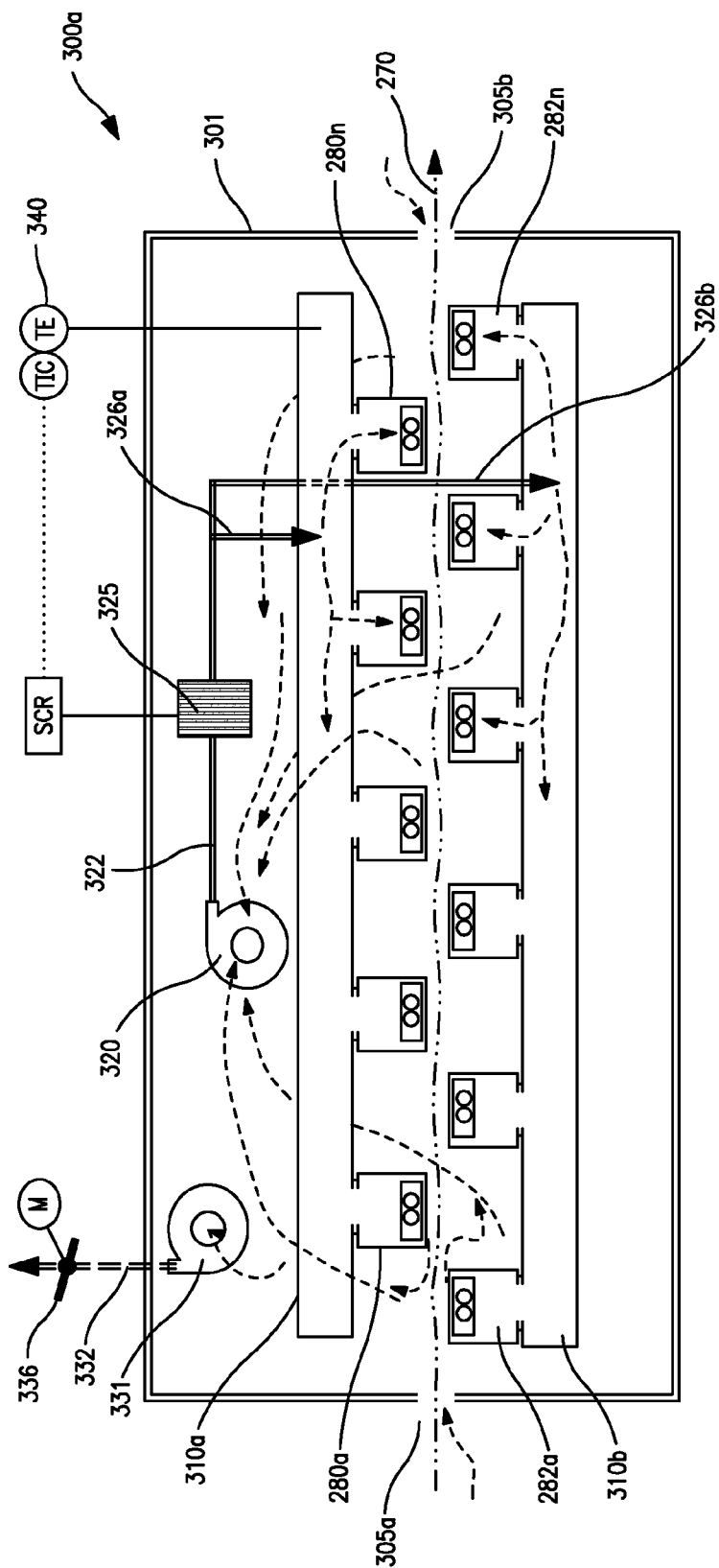
FIG. 11 is a schematic diagram of the dryer of FIG. 10A depicting supply air, re-circulating air and exhaust air flow paths.

FIG. 10 illustrates a dryer embodiment 300a comprised of a plurality of infrared air bars 280a-280n mounted to and in fluid communication with an air supply distribution header 310a, and a plurality of infrared air bars 282a-282n mounted to and in fluid communication with an air supply distribution header 310b. Fluid communication between the plurality of infrared air bars 280a-280n and 282a-282n to each respective header 310a and 310b is made through feed openings 315a-315n. The air feed openings 315a-315n are connected and sealed to air bar feed inlet 16 (FIG. 1) by means of separation joints 316a-316n which allow easy disconnection and removal of the infrared air bars from the dryer. The joints 316a-316n may be sealed with gasket material, compression seats, or other similar means as are known to those skilled in the art of flotation dryer design. FIG. 11 illustrates the air flow paths created by the air flow elements within the enclosure 301 of dryer 300a of FIG. 10 herein described. A zone supply fan 320 collects heated air from inside the enclosure 301 and discharges said air under pressure into a plenum 322 having an optional heat source 325. This heat source may be a fuel burner, a heat exchange coil from a heating media such a hot water, steam, or thermal oil, or preferably an electric element duct heater. After passing through optional heater 325, the heated air is directed to air distribution headers 310a and 310b via ducts 326a and 326b, respectively. Optional heater 325, if provided, may be controlled by an air temperature control loop 340. The heated air is then distributed to infrared air bars through feed openings 315a-315n wherein it is used to cool the internal elements of the infrared air bars. The air flow paths and cooling function within each infrared air bar have been described previously. Electrical power fed to the emitters is regulated by an operator through a user interface in communication with an SCR according to the web drying load in order to achieve a satisfactorily dried product. Once discharged from the air bar, the air comes into fluid contact with the web to convectively exchange heat and mass with the web 270. Following this exchange step, at least a portion of this "spent" air is drawn back to the inlet of supply fan 320. An amount of room air is drawn into enclosure 301 through web slots 305a and 305b. An exhaust flow balancing this room air and any evaporated solvents from the web must be continually ventilated out of the enclosure. To this purpose, a separate exhaust fan 331 draws at least a portion of said spent air through exhaust duct 332 and flow control damper 336 and discharges it to atmosphere. Alternatively, the exhaust flow rate could be controlled by a variable speed motor and drive connected to exhaust fan 331 instead of control damper 336. The separate exhaust fan 331 of dryer embodiment 300a is necessary for safely handling volatile flammable solvent materials and/or in the case a direct fired fuel burner is used for optional heater 325. Exhaust flow safety ventilation volume and treatment equipment (not shown) for air polluting materials in said exhaust may be required based on requirements set forth by parties having such jurisdiction as will be understood by those familiar with such regulations in their locale.

Figure 12:
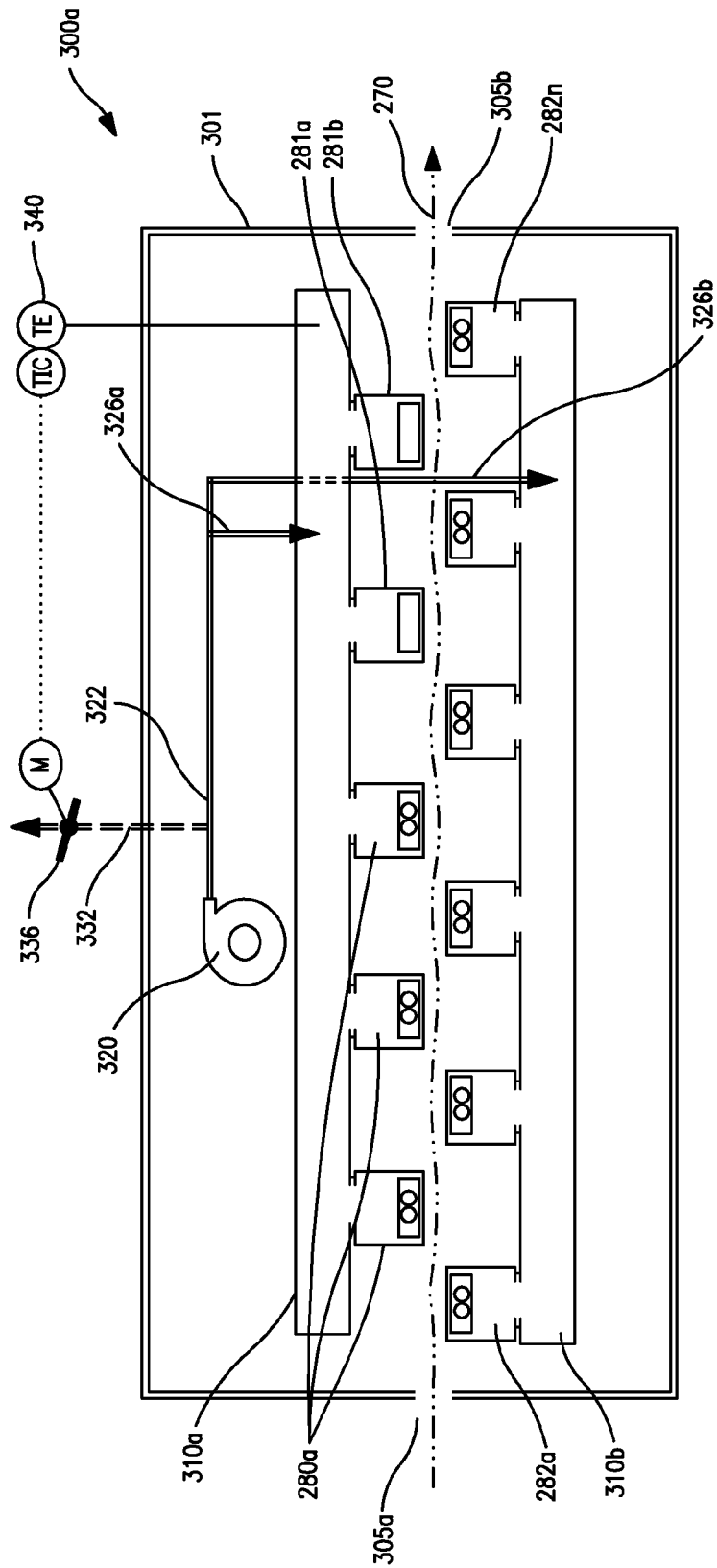
FIG. 12 is a schematic diagram of a dryer incorporating a plurality of IR float bars in conjunction with supply air, re-circulating air and exhaust air features in accordance with certain embodiments.

FIG. 12 illustrates a preferred dryer embodiment 300b for drying a non-flammable solvent, such as water, wherein supplemental heat beyond that provided by the infrared air bars is not needed to meet the thermal load required by the web. In some cases, where web drying heat load requirements are less than would be output by fully populating all air bar positions in distribution headers 310a and 310b, one or more positions for mounting air bars may be occupied by an air bar without an active infrared emitter, thus reducing the connected power load of the dryer. In the illustration of FIG. 12, the supply air header 310a is not fully populated with infrared air bars, but includes two non-infrared air bars 281a and 281b. Note these non-infrared air bars may be of a number of types which are familiar to those skilled in the art of air bar design. The non-infrared air bars are preferentially located near the web exit end of the dryer, and in the case of a single-side coating on the web, located on the uncoated side. Electrical power fed to the emitters is regulated by an operator through a user interface in communication with an SCR according to the web drying load in order to achieve a satisfactorily dried product. The supply air temperature is regulated by control loop 340 to maintain a set point by modulating the amount of exhaust through exhaust duct 330 by means of damper 335.

Figure 13:
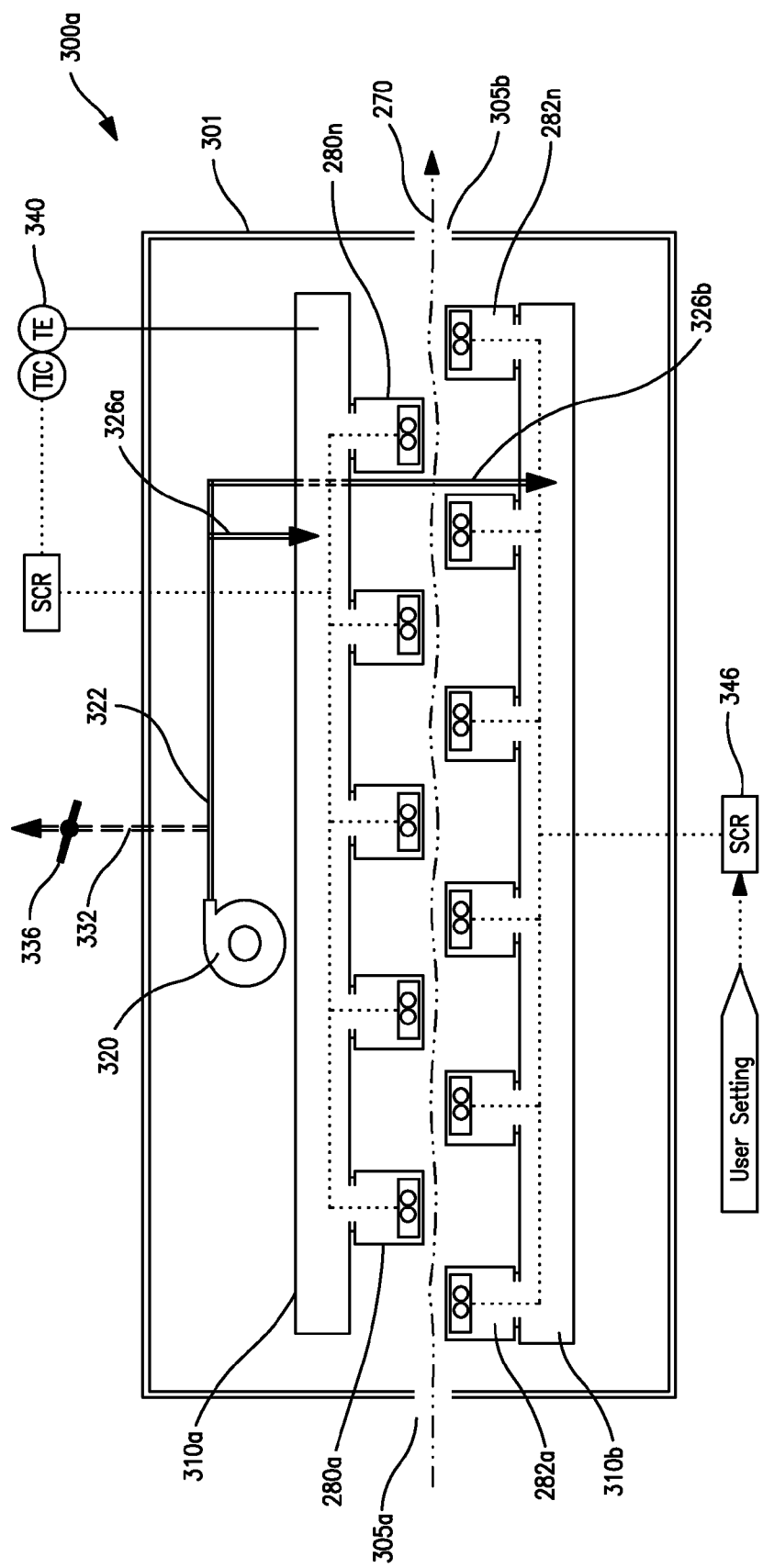
FIG. 13 is a schematic diagram of a dryer incorporating a plurality of IR float bars with controls in conjunction with supply air, re-circulating air and exhaust air features in accordance with certain embodiments.

FIG. 13 illustrates a preferred embodiment for a single-side coated or printed web wherein the ink or coating is on the bottom side of the web. Electrical power fed to emitters 282a-282n is regulated by an operator through a user interface in communication with an SCR 342 according to the web drying load in order to achieve a satisfactorily dried product. The air temperature is controlled through control loop 340a which regulates the power setting to SCR 341 which in turn modulates the power to the emitters in infrared air bars 280a-280n facing the uncoated side of the web.

Figure 3:
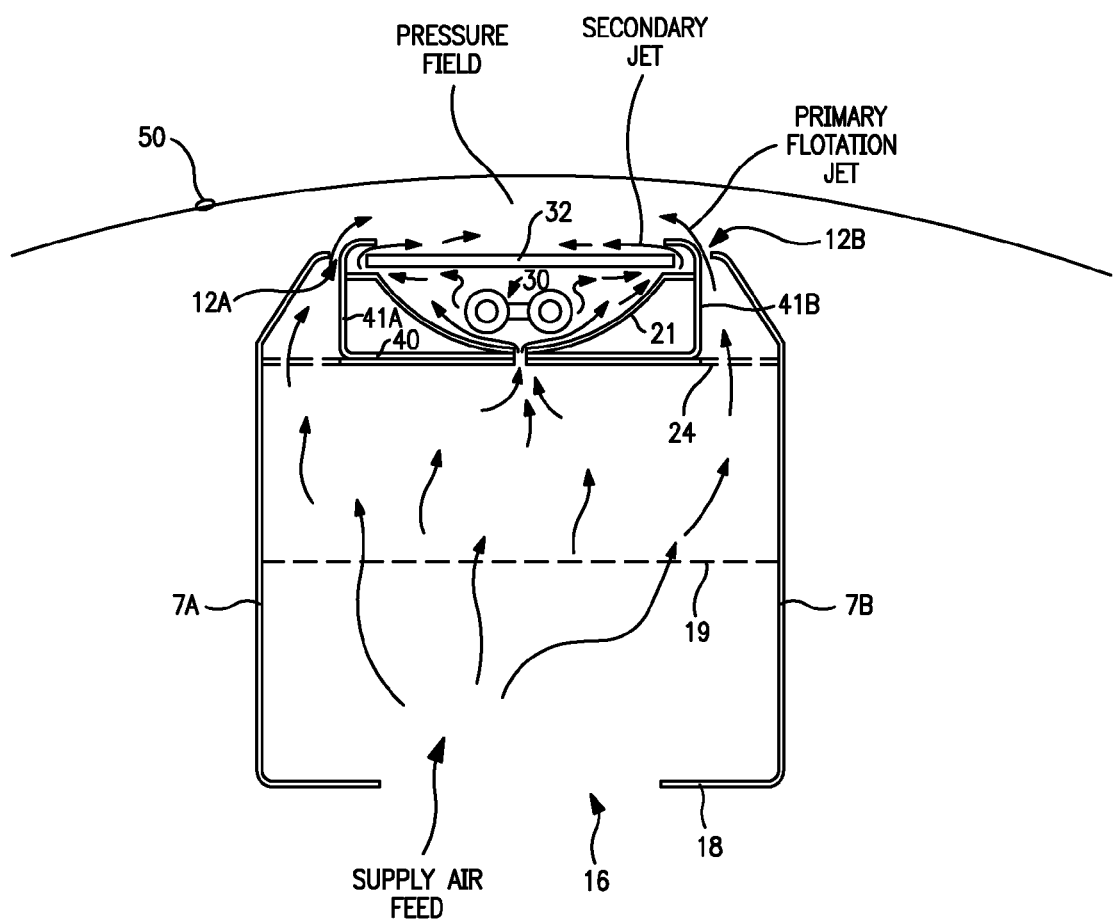
FIG. 3 is a cross-sectional view of the IR float bar of FIG. 1 showing airflow patterns.

The operation of the air bars will be illustrated with reference to the embodiment shown in FIG. 3. A plurality of infrared electromagnetic energy rays increase drying capacity because the infrared source is located at the point of highest heat transfer, e.g., between the discharge slots and radiate from the infrared source 32 either directly or indirectly through the lens 32. The infrared drying energy is transmitted for heating a traversing web being processed in a dryer. A portion of the infrared rays reflect off the parabolic reflector 21 and through the lens to impart infrared drying energy upon and heating the web. The wave length of the infrared electromagnetic rays emitted from the infrared source 32 can be short wave with a wave length of 0.78 to 1.2 microns, medium wave length with a wave length of 1.2 to 4.0 microns or long wave length of 4.0 to at least 10 or more microns. In certain embodiments, the infrared source 32 is positioned at a point of maximum energy transfer.

Pressurized air to float the web enters the infrared air bar through the plurality of oval shaped air inlets 16 to float the web. From the air inlets, the pressurized air proceeds as indicated by dashed arrow lines (FIG. 3) through the holes of the initial air distribution member 19, through the holes of the secondary air distribution member 24, through the Coanda slots 12A and 12B, along the Coanda curves defined by the side members 41A, 41B of the channel assembly 20, and then inwardly along the upper surface of the lens 32 and upwardly, thus providing float lift for the web 50 and also carrying away solvent vapors in the web. Air also flows into the channel 20 and around the elements disposed therein to cool the same, and then ultimately leaks out through the clearance between the lens 32 and the side members 41A, 41B and sweeps over the outer face of the lens 32.

Direct and indirect infrared energy rays impinge on the web 50 and heat the web as it passes over the pressure pad created by the Coanda slots, thus drying and evaporating solvents from the web. This, in combination with impinging flow of air, maximizes the heat transfer in the area of the pressure pad.

Output of the infrared source 30 can be variably controlled, such as by an SCR so that the amount of energy output transmitted from the infrared source includes a range from full power to no power, and any variable range therebetween.

Embodiments disclosed herein provide an air float bar with at least one primary air jet for flotation flow and heat transfer to the web and at least one integrated infrared emitter for use in the drying or heat treatment of webs, so as to maximize the utilization of infrared energy to heat and/or dry the web when in combination with at least one secondary air jet. The at least one secondary air jet is supplied by about 5 to 40% of the total air (preferably 7 to 15%) which is first heated by passing in fluid contact with at least one infrared emitter and is preferably also guided in fluid contact with a reflector, and further guided in fluid contact with a lens that is transmissible to infrared energy. The secondary jet is guided in fluid contact in a substantially parallel flow direction to the lens surfaces and provides at least a portion of the flotation air in conjunction with the at least one primary air jet, the parallel flow providing sufficient cooling to the emitter, reflector and lens elements to prevent ignition of combustible web or coating materials even under upset conditions. An optimum amount of cooling air is guided in contact with the emitter, reflector and lens surfaces to promote effective cooling of the emitter, reflector and lens, and further the cooling air is guided after contacting and gaining heat from said surfaces to deliver mass flow and thermal energy to the web by convection. The cooling air is also guided over the surfaces to prevent contact of the solvent-laden air inside the drying enclosure from contacting said surfaces, thus preventing their contamination.

From the forgoing discussion, it can be appreciated that the combined convection and radiation heat transfer modes of the present invention are driven substantially independently by virtue of the convection air temperature and emitter temperature, respectively. This feature can be used to advantage in the embodiments disclosed herein for the purpose of rapidly drying high moisture areas without excessively heating low moisture areas. Such disparities in moisture across a web are common in printing where heavy ink images are present alongside of low coverage or unprinted areas. The embodiments disclosed herein provide a selectivity in heating wet areas in that the heavy print areas require large heat flux to dry quickly and remain at or near the wet bulb temperature due to the evaporative cooling effect, thus these areas will be substantially heated by both the radiation and the high velocity convection modes provided by this infrared floatation air bar. On the other hand, those areas having little or no coverage will tend to increase in temperature by the infrared radiation from the emitters, but near the exit of the dryer can be cooled by the convection air to avoid overheating. The electromagnetic energy from the infrared elements is emitted at a relatively high temperature (typically >2000° F.) compared to the web temperature (typically 150 to 300° F.). As a result, according to the Stefan-Boltzman law the emissive heat flux to the web changes relatively little as the web temperature increases because the emitter temperature is quite high and the emitter temperature dominates the radiation flux potential according to the forth power of absolute temperature. By contrast, the heat transfer by convection is driven by a linear potential between air temperature and web temperature. The maximum web temperature for a given web material being thermally processed is often limited during the drying operation in order to avoid quality defects in the web or coating. When ink or coating materials are overheated beyond their maximum thermal rating as specified by the manufacturer, they may degrade in function and appearance often becoming discolored, brittle or chalky. Similarly, if the web substrate materials are overheated beyond their maximum thermal rating as specified by the manufacturer they may degrade in mechanical performance as well as appearance, often becoming discolored, brittle or distorted. For example, polymer web materials such as PET may soften and stretch causing distortion of the initially planar web resulting in waves or cockling, especially at temperatures exceeding 200° F. Paper webs may exhibit similar out-of-plane distortion due to hygroscopic shrinkage of over-dried areas having less than 3% moisture in proximity to heavy coated or printed areas having moisture levels several percent higher than the adjoining areas. Paperboard tends to curl if the moisture on one side is reduced to levels several percent lower than the opposite side. Additionally, paper and paperboard material will tend to brown and become brittle at temperatures in the range of 350 to 400° F., and eventually burn at higher temperatures. In order to avoid these problems, printers and converters of web materials will be familiar with the maximum temperature limitations for processing of the web and coating through specifications provided by the suppliers of the materials, or from pilot drying trials, or by experience with same or similar materials in prior production processing. In embodiments disclosed herein, if the air temperature set point is selected at a temperature just below the maximum web temperature to be tolerated in the hottest (driest) areas of the web, the infrared heating in these areas will be countered by convective cooling, thus mitigating excessive temperature in said driest areas. Air temperature set points from 10 to 50 Fahrenheit degrees below the maximum web temperature to be tolerated were found to be effective in avoiding overheating of the web. Alternatively, the air temperature may be selected and regulated to be typically in the range of 30 to 100 Fahrenheit degrees above the wet bulb temperature in the dryer (wet bulb typically <180° F.) the convective flux potential is diminished and even reversed, thus slowing the rate of heating of the web in the driest areas once the web temperature in those areas exceeds the air temperature.

In order to limit the overheating of the driest areas as described, the convection coefficient provided by the infrared air bars must be suitably high, exceeding that of conventional cooling air systems employed in non-flotation infrared dryers. Suitable air bar heat convection heat transfer coefficients are in the range of about 10 to about 40 BTU/hr-ft$^2$-F. Suitable air bar slot jet velocities are in the range of from about 5000 to about 16000 feet per minute.

The air temperature supplied to the nozzles may be regulated by adding a controlled input of heat from an independent heat source such as an electric resistance coil, hot oil or steam coil, or a burner located in the ducting supplying the air to bars. In preferred embodiments, the need for an independent source of heat is obviated by recovering the heat from the emitters that is not absorbed by the radiation mode into the web into the re-circulated air. This includes the heat taken up in the emitter cooling air as previously described, and similarly the heat recovered from stray infrared energy (electromagnetic waves that reflect or otherwise impinge on surfaces other than the web) that tends to elevate the temperature of other surfaces inside the dryer over which the re-circulation air flows, and heat from those areas of the web that have been heated above the supply air temperature by the radiation mode as described earlier. This heat recovered in the re-circulation air may be retained by minimizing the amount of air exhausted to about 10% or less of the air bar supply air thus maximizing the re-circulating air temperature. On the other hand, if it is desired to lower the air temperature, the amount of exhaust may be increased to about 30% or more thus drawing in more ambient air that must be heated in the re-circulating flow. Those skilled in the art of dryers will be familiar with regulation of exhaust flow by means of a damper, or fan with a variable speed drive, in order to accomplish the air flow regulation described. This regulation may be done manually by an operator or by a closed-loop controller sensing air temperature and modulating the exhaust flow accordingly. In another preferred embodiment, the air temperature may be regulated by modulating the input power to at least one infrared emitter through a closed-loop controller. In the most preferred embodiment, the primary regulation of the air temperature is made by setting the dryer exhaust to achieve a desired temperature as previously mentioned, and further controlled by regulating the power to at least one emitter with a closed-loop controller which regulates the set point for the power output of an SCR supplying power to the at least one emitter.

In one application example, a printed paper web with a water-based ink, is to be dried. The expected wet bulb temperature is 135° F. and the convection air temperature is set to 170° F. The net radiative heat flux from the emitters to the unprinted web is 6,500 BTU/hr-ft$^2$ and the convection coefficient per side is 25 BTU/hr-ft$^2$-F. Thus the initial combined convection and radiation heating rate is 11,500 BTU/hr-ft$^2$ and the terminal temperature of the web, where radiation flux is offset by convection cooling in the unprinted areas of the web, will be ~300° F. Without the contributing effects of the flotation air bar convection air, the initial heating rate is only 6,500 BTU/hr-ft$^2$ resulting in slower heating, and the calculated terminal temperature is over 800° F., well above the ignition point of paper.

In the preferred dryer embodiment, the infrared air bars are placed 8 to 20 inches apart on each side of the web, with nozzle air jet velocities in the range of 5000 to 16,000 fpm, with the total emitter heat flux per emitter element mounted in each air bar in the range of 100 to 200 watts per inch for medium wave carbon emitters, and 200 to 400 watts per inch for near IR emitters. Air temperature set points in the range of 150 to 250° F. are preferred for water based coatings on paper substrates.

What is claimed is:

1. A channel assembly adapted to be inserted into an air bar, said channel assembly having a compartment defined by a bottom having a pair of opposing sides and at least one aperture having an adjustable open area, said compartment comprising an infrared light source for emitting electromagnetic energy, a reflector for reflecting electromagnetic energy emitted by said infrared light source, a lens transmissive to infrared light emitted from said infrared light source, said lens having opposite terminal ends and first and second spaced elongate longitudinal lens edges extending between said opposite terminal ends, and having a surface defined between said first and second spaced elongate longitudinal lens edges, and at least one elongate longitudinal slot extending between said first elongate longitudinal lens edge and one of said opposing sides of said compartment, wherein a boundary of said at least one slot is defined by said surface of said lens, wherein when said channel assembly is in said air bar in operation in a dryer for floating a web, cooling air flow from said at least one slot is discharged from said compartment parallel to said lens, sweeps said surface of said lens, and provides at least a portion of flotation air for floating the web.

2. The channel assembly as claimed in claim 1, wherein said channel assembly further comprises an adjustment member positioned in said channel assembly and having at least one adjustment member aperture alignable with said at least one aperture of said bottom so as to reduce said open area.

3. The channel assembly of claim 2, wherein said at least one aperture in said bottom and said at least one adjustment member aperture are diamond shape.

4. The channel assembly of claim 2, wherein the open area of said at least one adjustment member is smaller than said open area of said at least one aperture of said bottom.

5. The channel assembly of claim 2, further comprising a source of supply air for delivering air to said channel assembly, and wherein said adjustment member restricts said open area of said at least one aperture in said bottom to from 5 to 40% of said supply air delivered to said air bar.

6. The channel assembly of claim 5, wherein said adjustment member restricts said open area of said at least one aperture in said bottom to from 7 to 15% of said supply air delivered to said air bar.

7. The channel assembly of claim 1, wherein said reflector has at least one reflector aperture that is alignable with said at least one aperture having an adjustable open area.

8. A method of setting air flow in a channel assembly of an infrared air bar in fluid communication with a source of supply air providing a total air flow, comprising:
providing the channel assembly comprising a compartment defined by a bottom having a pair of opposing sides and at least one aperture having an adjustable open area, said compartment comprising an infrared light source for emitting electromagnetic energy, a reflector for reflecting electromagnetic energy emitted by said infrared light source, a lens transmissive to infrared light emitted from said infrared light source, said lens having opposite terminal ends and first and second spaced elongate longitudinal lens edges and a surface defined between said first and second spaced elongate longitudinal lens edges, and at least one elongate longitudinal slot extending between said first lens elongate longitudinal edge and one of said opposing sides of said compartment, wherein a boundary of said at least one slot is defined by said surface of said lens, wherein when said channel assembly is in said air bar in operation in a dryer for floating a web, cooling air flow from said at least one slot is discharged from said compartment parallel to said lens, sweeps said surface of said lens, and provides at least a portion of flotation air for floating the web; and
adjusting said open area of said at least one aperture such that 5 to 40% of said total air flow of said supply air to said air bar enters said compartment through said aperture in said bottom.

9. The method of claim 8, wherein said open area of said at least one aperture is adjusted such that from 7 to 15% of the total flow of said supply air to said air bar enters said compartment through said aperture in said bottom.

10. The method of claim 8, further comprising providing an adjustment member positioned in said channel assembly and having at least one adjustment member aperture, and aligning said at least one adjustment member aperture with said aperture of said bottom so as to reduce said open area of said aperture of said bottom.

11. The method of claim 8, wherein said adjusting is carried out by sliding said adjustment member relative to said at least one aperture of said bottom.

12. The method of claim 8, wherein said reflector has at least one reflector aperture that is alignable with said at least one aperture having an adjustable open area.

13. The method of claim 12, wherein the step of adjusting said open area of said at least one aperture comprises adjusting the alignment between said at least one reflector aperture and said at least one aperture.

* * * * *